United States Patent [19]

Drysdale

[11] Patent Number: 5,641,853
[45] Date of Patent: Jun. 24, 1997

[54] POLYMERIZATION OF CYCLIC ETHERS USING SELECTED METAL COMPOUND CATALYSTS

[75] Inventor: Neville Everton Drysdale, Newark, Del.

[73] Assignee: E. I. Du Pont de Nemours and Company, Wilmington, Del.

[21] Appl. No.: 608,340

[22] Filed: Feb. 28, 1996

Related U.S. Application Data

[63] Continuation-in-part of Ser. No. 331,305, Oct. 28, 1994, abandoned.

[51] Int. Cl.⁶ .......................... C08G 65/16; C08G 65/20; C07C 41/01; C07C 41/16
[52] U.S. Cl. .......................... 528/233; 528/234; 528/235; 528/236; 528/237; 528/238; 528/405; 528/410; 528/411; 528/412; 528/413; 528/414; 528/415; 528/416; 568/613; 568/617; 568/622; 568/623; 568/624; 568/625
[58] Field of Search .................... 528/405, 410–416, 528/233–238; 568/613, 617, 622–625

[56] References Cited

U.S. PATENT DOCUMENTS

| | | | |
|---|---|---|---|
| 2,950,306 | 8/1960 | Smith | 260/440 |
| 3,842,019 | 10/1974 | Kropp | 260/2 EP |
| 3,907,706 | 9/1975 | Robins | 528/412 |
| 4,303,782 | 12/1981 | McHale et al. | 528/416 |
| 5,084,586 | 1/1992 | Farooq | 556/181 |
| 5,124,417 | 6/1992 | Farooq | 526/90 |
| 5,130,470 | 7/1992 | Dorai et al. | 560/200 |

FOREIGN PATENT DOCUMENTS

| | | |
|---|---|---|
| 0251104 | 1/1988 | European Pat. Off. . |
| 2235950 | 1/1975 | France . |
| 24 59 163 | 12/1974 | Germany . |
| 51-82397 | 7/1976 | Japan . |
| WO94/09055 | 4/1994 | WIPO . |

OTHER PUBLICATIONS

Yamashita, I et al, "The Polymerization of Tetrahydrofuran Using an Iron(III) Chloride–Triphenyl Phosphite Catalyst", *Kogyo Kagaku Zasshi*, 71(7), 1061–1064 (1968).

Hrkach, J.S. et al, "Cationic Polymerization of Tetrahydrofuran Initiated by Trimethylsilyl Trifluoromethanesulfonate", *Macromolecules*, 23, 4042–4046 (1990).

Olah, G.A. et al, "Cationic Ring Opening Polymerization of Tetrahydrofuran with Boron, Aluminum, and Gallium Tristriflate", *J. Appl. Polym. Sci.*, 45, 1355–1360 (1992).

Borkowsky, S.L. et al, "Synthesis and Chemistry of $Cp_2Zr(Ph)(THF)$. Selectivity of Protolytic and Oxidative Zr–R Bond–Cleavage Reactions", *Organometal.*, 10, 1268–1274 (1991).

*Chem. Abstr.*, 78(16), 98, 119d, Misaki, T. et al, *Nippon Kagaku Kaishi*, (1), 168–174 (1973).

*Primary Examiner*—D. R. Wilson

[57] ABSTRACT

A process for polymerizing oxepanes, dioxolanes, trioxanes, and tetrahydrofurans to their respective polymers by contacting them with a selected metal compound and an accelerator which is a selected vinyl ester or a selected phosphorous compound.

18 Claims, No Drawings

POLYMERIZATION OF CYCLIC ETHERS USING SELECTED METAL COMPOUND CATALYSTS

This application is a continuation-in-part of U.S. patent application Ser. No. 08/331,305 filed Oct. 28, 1994 now abandoned.

FIELD OF THE INVENTION

This invention concerns the polymerization of oxepanes, 1,3-dioxolanes, 1,3,5-trioxanes, and tetrahydrofurans to linear polyethers catalyzed by selected metal compounds together with selected accelerators.

BACKGROUND OF THE INVENTION

Cyclic ethers are polymerized by various means to give products of widespread utility. For instance, ethylene oxide is polymerized to polyethylene oxide which is useful, in lower molecular weight grades, for ceramics (as a binder), cosmetics, lubricants, polyurethanes; and in higher molecular weight grades, for packaging film, denture adhesives, lubricants, flocculation and for other articles and products. Tetrahydrofuran (THF) is polymerized to poly (tetramethylene ether) glycol which is useful in the preparation of Spandex fibers; polyurethane resins which are useful in elastomeric parts; and thermoplastic elastomers which are useful for molding various mechanical parts. Therefore, improved methods of making these polymers are sought.

U.S. Pat. No. 3,842,019 describes the polymerization of oxiranes and other small ring compounds by a presumed cationic mechanism, using as the catalyst the decomposition products of metal perfluoroalkylsulfonates. These catalysts are described as "latent", that is no reaction occurs until the metal salt is decomposed. The reactions reported are relatively slow, even at elevated temperatures.

U.S. Pat. Nos. 5,084,586 and 5,124,417 describe the cationic polymerization of various monomers, including cyclic ethers, using onium cations, whose corresponding anions are fluororalkylsulfatometallates. Onium ion catalyzed cationic polymerizations are known, and there is no mention in these patents of the use of metal salts not containing onium ions, such as metal triflates, as catalysts for the polymerization of cyclic ethers.

J. S. Hrkach, et al., Macromolecules, vol. 23, p. 4042–4046 (1990) describe the polymerization of tetrahydrofuran using trimethylsilyl trifluoromethanesulfonate as the initiator. No mention is made of any other triflates as catalysts for this polymerization.

G. A. Olah, et al., J. Appl. Polym. Sci., Vol. 45, 1355–1360 (1992) describe the use of boron, aluminum and gallium tristriflate to catalyze the polymerization of THF.

S. L. Borkowsky, et al., Organometal., Vol. 10, p. 1268–1274 (1991) report that certain zirconium complexes can initiate the polymerization of tetrahydrofuran. No mention is made of zirconium perfluoroalkylsulfonates, or of copolymers.

I. Yamashita, et al., Kogyo Kagaku Zasshi, vol. 71, p. 1061–1064 (1968) describes the polymerization of tetrahydrofuran using a catalyst system consisting of a Lewis acid such as ferric chloride and a phosphorous compound such as triphenyl phosphite. The use of metal perfluoroalkylsulfonates is not mentioned.

SUMMARY OF THE INVENTION

This invention concerns a process for the polymerization of cyclic ethers, comprising, contacting one or more tetrahydrofurans, oxepanes, 1,3-dioxolanes or 1,3,5-trioxanes with a compound of the formula $MZ_s \cdot Q_t$, and an accelerator which is a compound of the formula

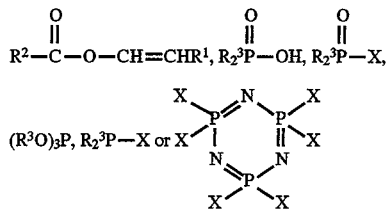

wherein:

$R^1$ is hydrogen, hydrocarbyl or substituted hydrocarbyl in which a substituent does not react with the starting materials or products and does not interfere with the polymerization;

$R^2$ is hydrogen, hydrocarbyl or substituted hydrocarbyl in which a substituent does not react with the starting materials or products and does not interfere with the polymerization;

each $R^3$ is independently hydrocarbyl or substituted hydrocarbyl in which a substituent does not react with the starting materials or products and does not interfere with the polymerization;

each X is independently chlorine, bromine or iodine;

M is a metal selected from the group consisting of strontium, barium, scandium, yttrium, the rare earth metals, titanium, zirconium, hafnium, chromium, molybdenum, tantalum, rhenium, iron, cobalt, vanadium, niobium, tungsten, ruthenium, osmium, rhodium, iridium, palladium, platinum, copper, silver, gold, zinc, cadmium, mercury, aluminum, gallium, indium, thulium, germanium, tin, mischmetall, lead, arsenic, antimony and bismuth;

at least one of Z is an anion of the formula $R^5SO_3^-$, wherein $R^5$ is perfluoroalkyl containing 1 to 12 carbon atoms or part of a fluorinated polymer wherein the carbon atoms alpha and beta to the sulfonate group are together bonded to at least four fluorine atoms, or tetraphenylborate, and the remainder of Z is oxo or one or more monovalent anions;

s is 1 when M is silver;

s is 2 when M is strontium, barium, copper, cobalt, rhodium, iridium, palladium, platinum, chromium, zinc, cadmium or mercury;

s is 3 when M is scandium, yttrium, a rare earth metal, arsenic, antimony, bismuth, gold, iron, ruthenium, osmium, aluminum, gallium, mischmetall, indium or thulium;

s is 4 when M is titanium, zirconium, hafnium, molybdenum, germanium, tin, or lead;

s is 5 when M is rhenium, vanadium, niobium or tantalum;

s is 6 when M is tungsten;

Q is a neutral ligand;

t is 0 or an integer of 1 to 6; and provided that each oxo group present counts as two of s.

DETAILED DESCRIPTION OF THE PREFERRED EMBODIMENTS

In the polymerization process described herein one or more cyclic ethers, oxepanes, 1,3-dioxolanes, 1,3,5-trioxanes, or tetrahydrofurans are polymerized to form a polyether. The term oxepane means a saturated seven membered ring system containing six carbon atoms and one oxygen atoms. The term tetrahydrofuran means a saturated 5-membered ring system containing 4 carbon atoms and one oxygen atom. The term 1,3-dioxolane means a saturated five membered ring system which contains two oxygen atoms separated by 1 carbon atom. The term 1,3,5-trioxane means a six membered ring system containing 3 oxygen atoms in which the oxygen atoms and carbons atoms are alternated. All of these terms include compounds containing those ring systems which are substituted with hydrocarbyl or hydrocarbylene groups containing 1 to 20 carbon atoms. The hydrocarbylene groups may form carbocyclic rings, which include bicyclic, tricyclic, etc., systems. By a hydrocarbylene group herein is meant a divalent radical containing carbon and hydrogen which is part of a carbocyclic ring.

Preferred cyclic ethers have the formula

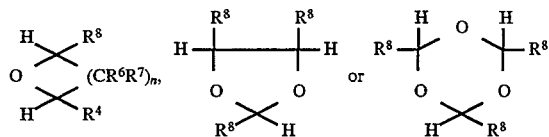

wherein n is 2 or 4 and each $R^8$, $R^6$, $R^7$ and $R^4$ is independently hydrogen or hydrocarbyl containing 1 to 20 carbon atoms. Some of these cyclic ethers polymerize to give repeat units of the formula —[$CHR^8(CR^6R^7)_nCHR^4O$]—. In a more preferred cyclic ether all of $R^8$, $R^6$, $R^7$ and $R^4$ are hydrogen. In another more preferred cyclic ether where n=2, $R^8$, one of $R^6$, both of $R^7$ and $R^4$ are hydrogen, and the remaining $R^6$ is alkyl containing 1–4 carbon atoms, especially preferably the remaining $R^6$ is methyl. By hydrocarbyl herein is meant a univalent radical containing carbon and hydrogen.

The polymerization is run in the presence of an accelerator. Suitable accelerators include selected vinyl esters and selected phosphorous compounds.

The vinyl ester accelerators have the formula

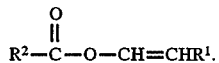

In a preferred vinyl ester $R^1$ is hydrogen or alkyl, more preferably hydrogen or n-alkyl. In another preferred vinyl ester $R^2$ is alkyl, phenyl, or substituted phenyl, more preferably n-alkyl. In an especially preferred vinyl ester $R^1$ is hydrogen and $R^2$ is methyl.

In the accelerators which are phosphorous compounds it is preferred if each $R^3$ is independently alkyl, phenyl, or substituted phenyl, more preferably n-alkyl containing 1, 2, 3 or 4 carbon atoms or phenyl. It is also preferred if X is chlorine.

By substituted hydrocarbyl (or substituted in substituted phenyl) is meant that the moiety may contain inert substituents (functional groups). By inert is meant that they don't react with any of the starting materials or products nor interfere with the polymerization. Such substituents include (linear) ether, alkyl, aryl, and halo.

An important consideration in the preparation of polyethers is the number average molecular weight (Mn) of the polyether and its molecular weight distribution. When the polyether is to be used as a monomer in the preparation of another polymer (usually in the diol form), it is often preferred that the Mn of the polyether be in the range of about 400 to about 20,000, preferably about 500 to about 5,000.

The catalyst may be yttrium or a rare earth compound of the formula $MZ_3$ where M is a trivalent ion of yttrium, or one of the rare earths, lanthanum, cerium, praseodymium, neodymium, promethium, samarium, europium, gadolinium, terbium, dysprosium, holmium, erbium, thulium, ytterbium, and lutetium.

Preferred metals, M, are strontium, scandium yttrium, the rare earth metals, titanium, zirconium, hafnium, vanadium, niobium, tantalum, chromium, molybdenum, tungsten, rhenium, iron, ruthenium, palladium, copper, gold, zinc, tin and bismuth. More preferred metals are yttrium, the rare earth metals, and scandium. Especially preferred metals are yttrium, ytterbium, dysprosium, erbium, neodymium, lanthanum, and scandium. Another preferred metal is "mischmetall" (sometimes also called "didymium"), which is a mixture of rare earth metals as obtained from the ore.

It is currently believed monovalent anions that are relatively nonnucleophilic are useful as Z. Examples of such anions are tetraphenylborate, $R^5SO_3^-$, wherein $R^5$ is perfluoroalkyl, or wherein $R^5$ is part of a fluorinated polymer wherein the carbon atoms alpha and beta to a sulfonate group are together bonded to at least 4 fluorine atoms (as in —$CF_2CF_2SO_3^-$). It is preferred if $R^5$ is perfluoroalkyl. In a particularly preferred embodiment, $R^5$ is trifluoromethyl, and the anion is herein called "triflate".

Generally speaking, any metallic compound in which the correct metal in the correct oxidation state (see above) is present and bonded to a triflate or similar anion will be a catalyst. Such a compound must of course be reasonably stable during the polymerization or decompose to another compound which is still a triflate (or similar anion) compound of the metal in the correct oxidation state. It has been found that, in general, the greater the number of triflate groups bonded to the metal cation, the more active the metal compound will be as a catalyst. It is preferred if half or more of the anions (Z) bound to each metal cation is triflate or a similar anion.

The metal catalysts may optionally contain one or more neutral ligands coordinated to the metal. By a neutral ligand is meant a neutral compound that can coordinate with the catalysts, usually the metal cation. Neutral ligands include water, and ethers such as dimethyl ether and tetrahydrofuran.

The metals catalysts may contain other anions than triflate and similar anions, and tetrafluoroborate, although at least one of triflate or tetrafluoroborate anions must be present. Some other useful anions are alkoxide, particularly lower alkoxide containing 1–4 carbon atoms, acetylacetonate, cyclopentadieneide, pentamethylcyclopentadieneide, t-butylacetylacetonate, and halide. It is preferred if all of the anions are triflate.

In general, the higher the molar ratio of metal compound to cyclic ether monomer originally present, the lower the molecular weight of the resulting polyether will be. Similarly, the higher the ratio of accelerator (if present) to monomer originally present, the lower the molecular weight of the polyether will be. It is currently believed that the effects of these two ratios are cumulative.

The polymerization may be run at a temperature of about −80° C. up to a temperature of 95° C. but essentially no higher, so as to be lower than the about 100° C. minimum temperature disclosed in U.S. Pat. No. 3,907,706 (Robins). The polymerization may also be run at a temperature of about −80° C. to about 90° C. or at a temperature of about −80° C. to about 85° C. If this temperature is above the boiling point of the cyclic ether monomer, a pressure vessel may be used. A preferred temperature is ambient to the boiling point of the monomer, or 95° C., whichever is lower. An inert solvent such as di-n-butyl ether, diethyl ether or toluene may be used, but it is preferred if solvents are not present. Protic compounds such as water, methanol and ethanol should preferably not be present, and it is convenient to exclude them by drying the starting materials and keeping the process under an inert dry gas such as nitrogen. As in most chemical processes, the ingredients should be mixed at least initially. Continued agitation is preferred to assure that the process materials remain well mixed, and to avoid overheating. The polymerization is mildly exothermic. If the polymerization temperature goes up appreciably, refluxing of the monomer may be used to help cool the process.

The polymerization process can be performed in a variety of ways known to those skilled in the art. It can be done by batch, semi-batch and continuous processes. Continuous processes include continuous stirred tank reactor(s) with one or more stages, and/or plug flow reactors. Other variations will be evident to those skilled in this art.

In the polymerization process disclosed herein the catalyst may be recovered and reused. It may be recovered from the polymerization process by extracting the polymer formed with water. The recovered catalyst may be used again in the polymerization. The aqueous washings may be concentrated by removal of the water (as by evaporation) and the solid catalyst recovered.

EXAMPLES

In the following non-limiting Examples, the following abbreviations are used:

GPC—gel permeation chromatography
Mn—number average molecular weight
Mw—weight average molecular weight
PD—polydispersity, Mw/Mn
PS—polystyrene
RB—round-bottomed
STD—standard
THF—tetrahydrofuran Example 1

Polymerization of THF with Diethyl Chlorophosphite and Ytterbium Triflate

In a dry box, ytterbium triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and diethyl chlorophosphite (1.00 mL) were added. After 17 hours the polymerization was terminated via the addition of water, THF and ether. The resulting organic phase was separated, concentrated at reduced pressure and then dried under vacuum affording 12.63 g of polymer. GPC analysis (PS STD.): Mn=10200, Mw=20100, PD=1.96.

Example 2

Polymerization of THF with Diphenylphosphinic Acid and Ytterbium Triflate

In a dry box, ytterbium triflate (2.00 g) and diphenylphosphinic acid (1.00 g) were weighed in an oven dried 100 mL RB flask equipped with a stirring bar. The flask was sealed with a rubber septum and removed from the dry box. After the attachment of a nitrogen bleed, THF (20.0 mL) was added. After 17 hours the polymerization was terminated via the addition of water, THF and ether. The resulting white mixture was filtered through Celite. The resulting filtrate was washed with water, concentrated at reduced pressure and dried under vacuum affording 8.22 g of polymer. GPC analysis (PS STD.): Mn=50900, Mw=112000, PD=2.21.

Example 3

Polymerization of THF with Diethyl Chlorophosphite and Erbium Triflate

In a dry box, erbium triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and diethyl chlorophosphite (2.00 mL) were added. After 17 hours the polymerization was terminated via the addition of water, THF and ether. The separated organic phase was again washed with water. The organic phase was concentrated at reduced pressure and then dried under vacuum affording 9.68 g of polymer. GPC analysis (PS STD.): Mn=10800, Mw=19600, PD=1.82.

Example 4

Polymerization of THF with Diethyl Chlorophosphite and Neodynium Trifle

In a dry box, neodynium triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and diethyl chlorophosphite (2.00 mL) were added. After 17 hours the polymerization was terminated via the addition of water, THF and ether. The separated organic phase was again washed with water. The organic phase was concentrated at reduced pressure and then dried under vacuum affording 4.73 g of polymer. GPC analysis (PS STD.): Mn=12200, Mw=22600, PD=1.85.

Example 5

Polymerization of THF with Diethyl Chlorophosphite and Dysprosium Triflate

In a dry box, dysprosium triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and diethyl chlorophosphite (2.00 mL) were added. After 17 hours the polymerization was terminated via the addition of water, THF and ether. The separated organic phase was again washed with water. The organic phase was concentrated at reduced pressure and then dried under vacuum affording 9.80 g of polymer. GPC analysis (PS STD.): Mn=14100, Mw=27900, PD=1.98.

Example 6

Polymerization of THF with Diethyl Chlorophosphite and Tin Triflate

In a dry box, tin triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and diethyl chlorophosphite (2.00 mL) were added. After 17 hours the polymerization was terminated via the addition of water, THF and ether. The separated organic phase was again washed with water. The organic phase was concentrated at reduced pressure and then dried under vacuum affording 14.93 g of polymer. GPC analysis (PS STD.): Mn=2680, Mw=5520, PD=2.06.

Examples 7

Polymerization of THF with Diethyl Chlorophosphite and Bismuth Triflate

In a dry box, bismuth triflate (2.00 g) was weighed in an oven dried 100 mL RB flask equipped with a stirring bar.

The flask was sealed with a rubber septum and removed from the dry box. After the attachment of a nitrogen bleed, THF (20.0 mL) and diethyl chlorophosphite (2.00 mL) were added. After 17 hours the polymerization was terminated via the addition of water, THF and ether. The separated organic phase was again washed with water. The organic phase was concentrated at reduced pressure and then dried under vacuum affording 7.99 g of polymer. GPC analysis (PS STD.): Mn=3050, Mw=6600, PD=2.16.

Example 8

Polymerization of THF with Diethyl Chlorophosphite and Lanthanum Triflate

In a dry box, lanthanum triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and diethyl chlorophosphite (2.00 mL) were added. After 15 hours the polymerization was terminated via the addition of water, THF and ether. The separated organic phase was again washed with water. The organic phase was concentrated at reduced pressure and then dried under vacuum affording 7.03 g of polymer. GPC analysis (PS STD.): Mn=14500, Mw=30300, PD=2.08.

Example 10

Polymerization of THF with Phosphonitrilic Trimer and Ytterbium Triflate

In a dry box, ytterbium triflate (2.00 g) and phosphonitrilic trimer (1.00 g) were weighed in an oven dried 100 mL RB flask equipped with a stirring bar. The flask was sealed with a rubber septum and removed from the dry box. After the attachment of a nitrogen bleed, THF (20.0 mL) was added. After 16 hours the polymerization was terminated via the addition of water, THF and ether. The separated organic phase was again washed with water. The organic phase was concentrated at reduced pressure and then dried under vacuum affording 7.78 g of polymer. GPC analysis (PS STD.): Mn=6710, Mw=28500, PD=4.25.

Example 11

Polymerization of THF with Vinyl Acetate and Ytterbium Triflate

In a dry box, ytterbium triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and vinyl acetate (1.00 mL) were added. After 17 hours the polymerization was terminated via the addition of water, THF and ether. The resulting organic phase was separated, washed with water, concentrated at reduced pressure and then dried under vacuum affording 7.66 g of polymer. GPC analysis (PS STD.): Mn=184000, Mw=335000, PD=1.82.

Example 12

Polymerization of THF with Vinyl 2-Ethylhexanoate and Ytterbium Triflate

In a dry box, ytterbium triflate (2.00 g) was added to each of four 100 mL RB flasks equipped with stirring bars. The flasks were sealed with rubber septa and removed from the dry box. After attachment of nitrogen bleeds THF (20.0 mL) was added to each flask. Vinyl 2-ethylhexanoate (1.0, 2.0, 3.0 and 4.0 mL) was added to each flask. After 17 hours the polymerizations were terminated via the addition of water, THF and ether. The separated organic phases were again washed with water, separated, concentrated at reduced pressure and then dried under vacuum. Polymer yields and GPC analyses:

| Vinyl 2-Ethyl-hexanoate (mL) | Polymer Yield (g) | Mn (PS STD.) | Mw | PD |
| --- | --- | --- | --- | --- |
| 1.0 | 1.47 | 435000 | 774000 | 1.78 |
| 2.0 | 1.85 | 429000 | 681000 | 1.59 |
| 3.0 | 2.28 | 410000 | 622000 | 1.52 |
| 4.0 | 3.07 | 253000 | 543000 | 2.15 |

Example 13

Polymerization of THF with Vinyl Acetate and Bis (n-cyclopentadienyl)tetrahydrofuran-bis (trifluoromethanesulfonato) zirconium ($Cp_2Zr[(O_3SCF_3)_2]$ (THF))

In a dry box, bis(n-cyclopentadienyl)tetrahydrofuran-bis (trifluoromethanesulfonato) zirconium ($Cp_2Zr[(O_3SCF_3)_2]$ (THF)) (2.00 g) was weighed in an oven dried 100 mL RB flask equipped with a stirring bar. The flask was sealed with a rubber septum and removed from the dry box. After the attachment of a nitrogen bleed, THF (20.0 mL) and vinyl acetate (2.00 mL) were added. After 17 hours the polymerization was terminated via the addition of water, THF and ether. The resulting organic phase was separated, washed with water, concentrated at reduced pressure and then dried under vacuum affording 12.17 g of polymer. GPC analysis (PS STD.): Mn=60100, Mw=126000, PD=2.10.

Example 14

Polymerization of THF with Vinyl Acetate and Yttrium Triflate

In a dry box, yttrium triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and vinyl acetate (3.00 mL) were added. After 19.5 hours the polymerization was terminated via the addition of water, THF and ether. The resulting organic phase was separated, washed with water, concentrated at reduced pressure and then dried under vacuum affording 3.15 g of polymer. GPC analysis (PS STD.): Mn=100000, Mw=194000, PD=1.94.

Example 15

Polymerization of THF with Vinyl Acetate and Erbium Triflate

In a dry box, erbium triflate (2.00 g) was weighed in an oven dried 100 mL RB flask equipped with a stirring bar. The flask was sealed with a rubber septum and removed from the dry box. After the attachment of a nitrogen bleed, THF (20.0 mL) and vinyl acetate (3.00 mL) were added. After 17 hours the polymerization was terminated via the addition of water, THF and ether. The resulting organic phase was separated, washed with water, concentrated at reduced pressure and then dried under vacuum affording 0.54 g of polymer. GPC analysis (PS STD.): Mn=222000, Mw=396000, PD=1.76.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than the foregoing specification, as indicating the scope of the invention.

What is claimed is:

1. A process for the polymerization of cyclic ethers, comprising, contacting at a temperature of about −80° C. to about 90° C. one or more tetrahydrofurans, oxepanes, 1,3-dioxolanes or 1,3,5-trioxanes with a compound of the formula $MZ_s \cdot Q_t$, and an accelerator which is a compound of the formula

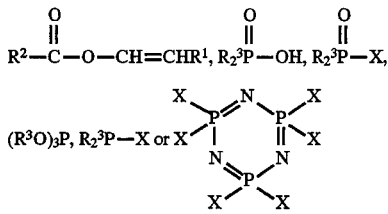

wherein:
- $R^1$ is hydrogen, hydrocarbyl or substituted hydrocarbyl in which a substituent does not react with the starting materials or products and does not interfere with the polymerization;
- $R^2$ is hydrogen, hydrocarbyl or substituted hydrocarbyl in which a substituent does not react with the starting materials or products and does not interfere with the polymerization;
- each $R^3$ is independently hydrocarbyl or substituted hydrocarbyl in which a substituent does not react with the starting materials or products and does not interfere with the polymerization;
- each X is independently chlorine, bromine or iodine;
- M is a metal selected from the group consisting of strontium, barium, scandium, yttrium, the rare earth metals, titanium, zirconium, hafnium, chromium, molybdenum, tantalum, rhenium, iron, cobalt, vanadium, niobium, tungsten, ruthenium, osmium, rhodium, iridium, palladium, platinum, copper, silver, gold, zinc, cadmium, mercury, aluminum, gallium, indium, thulium, germanium, tin, mischmetall, lead, arsenic, antimony and bismuth;
- at least one of Z is an anion of the formula $R^5SO_3^-$, wherein $R^5$ is perfluoroalkyl containing 1 to 12 carbon atoms or part of a fluorinated polymer wherein the carbon atoms alpha and beta to the sulfonate group are together bonded to at least four fluorine atoms, or tetraphenylborate, and the remainder of Z is oxo or one or more monovalent anions;
- s is 1 when M is silver;
- s is 2 when M is strontium, barium, copper, cobalt, rhodium, iridium, palladium, platinum, chromium, zinc, cadmium or mercury;
- s is 3 when M is scandium, yttrium, a rare earth metal, arsenic, antimony, bismuth, gold, iron, ruthenium, osmium, aluminum, gallium, mischmetall, indium or thulium;
- s is 4 when M is titanium, zirconium, hafnium, molybdenum, germanium, tin, or lead;
- s is 5 when M is rhenium, vanadium, niobium or tantalum;
- s is 6 when M is tungsten;
- Q is a neutral ligand;
- t is 0 or an integer of 1 to 6; and provided that each oxo group present as part of Z is considered to account for two of s.

2. The process as recited in claim 1 wherein M is a metal selected from the group consisting of strontium, barium, scandium, yttrium, the rare earth metals, titanium, zirconium, vanadium, niobium, hafnium, chromium, molybdenum, tantalum, rhenium, iron, ruthenium, osmium, tungsten, rhodium, iridium, palladium, platinum, copper, silver, gold, zinc, cadmium, mercury, germanium, tin, lead, arsenic, mischmetall, antimony and bismuth.

3. The process as recited in claim 2 wherein said cyclic ether comprises the formula

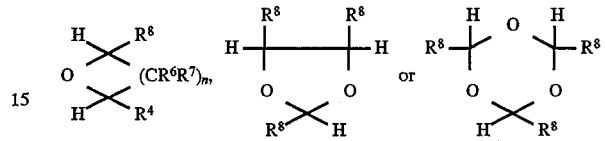

wherein:
- each $R^8$, $R^6$, $R^7$ and $R^4$ is independently hydrogen or hydrocarbyl containing 1 to 20 carbon atoms; and
- n is 2 or 4.

4. The process as recited in claim 3 wherein n is 2 and $R^8$, $R^4$ and all of $R^6$ and $R^7$ are hydrogen.

5. The process as recited in claim 3 wherein n is 2 and $R^8$ and $R^4$ are each hydrogen, one of $R^6$ is hydrogen, the other $R^6$ is methyl, and both $R^7$ are hydrogen.

6. The process as recited in claim 2 wherein $R^5$ is trifluoromethyl or perfluoroalkyl.

7. The process as recited in claim 4 wherein M is strontium, scandium, yttrium, the rare earth metals, titanium, zirconium, hafnium, vanadium, niobium, tantalum, chromium, molybdenum, tungsten, rhenium, iron, ruthenium, palladium, copper, gold, zinc, tin, bismuth or mischmetall.

8. The process as recited in claim 1 wherein said accelerator is a compound of the formula

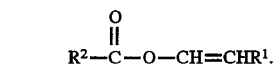

9. The process as recited in claim 8 wherein $R^1$ is hydrogen or alkyl, and $R^2$ is alkyl, phenyl, or substituted phenyl.

10. The process as recited in claim 8 wherein $R^1$ is hydrogen and $R^2$ is methyl.

11. The process as recited in claim 4 wherein said accelerator is

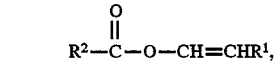

and $R^1$ is hydrogen or alkyl, and $R^2$ is alkyl, phenyl, or substituted phenyl and in which a substituent does not react with the starting materials or products and does not interfere with the polymerization.

12. The process as recited in claim 4 wherein said accelerator is

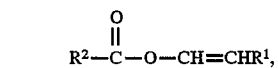

and $R^1$ is hydrogen and $R^2$ is methyl.

13. The process as recited in claim 1 wherein said accelerator is

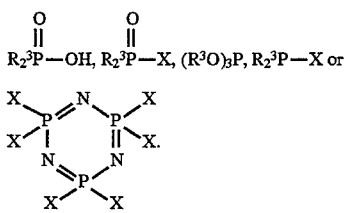

14. The process as recited in claim 13 wherein each $R^3$ is independently alkyl, phenyl, or substituted phenyl, and X is chlorine.

15. The process as recited in claim 13 wherein each $R^3$ is n-alkyl containing 1, 2, 3 or 4 carbon atoms or phenyl.

16. The process as recited in claim 4 wherein said accelerator is

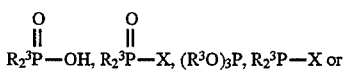

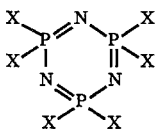

and each $R^3$ is independently alkyl, phenyl, or substituted phenyl, and X is chlorine.

17. The process as recited in claim 1 wherein polymerization occurs at a temperature of about −80° C. to about 85° C.

18. The process as recited in claim 1 wherein polymerization occurs between ambient temperature and the boiling point of the cyclic ether monomer, or 90° C., whichever is lower.

* * * * *